(12) United States Patent
Krishnan et al.

(10) Patent No.: US 8,332,205 B2
(45) Date of Patent: Dec. 11, 2012

(54) MINING TRANSLITERATIONS FOR OUT-OF-VOCABULARY QUERY TERMS

(75) Inventors: Saravanan Krishnan, Bangalore (IN); Uppinakuduru Raghavendra Udupa, Bangalore (IN)

(73) Assignee: Microsoft Corporation, Redmond, WA (US)

(*) Notice: Subject to any disclaimer, the term of this patent is extended or adjusted under 35 U.S.C. 154(b) by 605 days.

(21) Appl. No.: 12/350,981

(22) Filed: Jan. 9, 2009

(65) Prior Publication Data
US 2010/0185670 A1  Jul. 22, 2010

(51) Int. Cl.
G06F 17/28 (2006.01)
G06F 17/20 (2006.01)

(52) U.S. Cl. ............. 704/4; 704/1; 704/5; 704/7; 704/8; 704/10; 704/277

(58) Field of Classification Search ................ 704/1–10, 704/277
See application file for complete search history.

(56) References Cited

U.S. PATENT DOCUMENTS

| | | | |
|---|---|---|---|
| 5,278,980 A * | 1/1994 | Pedersen et al. ...................... 1/1 |
| 5,873,055 A * | 2/1999 | Okunishi .......................... 704/2 |
| 6,081,774 A * | 6/2000 | de Hita et al. ..................... 704/9 |
| 6,104,989 A | 8/2000 | Kanevsky et al. |
| 6,349,276 B1 | 2/2002 | McCarley |
| 6,477,451 B1 * | 11/2002 | Kyrtsos ........................ 701/33.9 |
| 6,604,101 B1 * | 8/2003 | Chan et al. .................... 707/706 |
| 7,143,091 B2 | 11/2006 | Charnock et al. |
| 7,249,013 B2 * | 7/2007 | Al-Onaizan et al. .............. 704/9 |
| 7,366,654 B2 | 4/2008 | Moore |
| 7,376,648 B2 * | 5/2008 | Johnson ................................ 1/1 |
| 7,457,808 B2 | 11/2008 | Gaussier et al. |
| 7,475,010 B2 | 1/2009 | Chao |
| 7,580,830 B2 * | 8/2009 | Al-Onaizan et al. ............... 704/2 |
| 7,587,307 B2 * | 9/2009 | Cancedda et al. ................ 704/2 |
| 7,827,027 B2 * | 11/2010 | Wu et al. ........................... 704/2 |
| 7,853,444 B2 * | 12/2010 | Wang et al. ....................... 704/2 |
| 7,890,325 B2 * | 2/2011 | Liu et al. ...................... 704/240 |
| 7,983,903 B2 | 7/2011 | Gao |
| 8,056,052 B2 * | 11/2011 | Deshpande et al. .......... 717/107 |
| 8,069,027 B2 * | 11/2011 | Liu et al. ............................ 704/2 |
| 2002/0193983 A1 * | 12/2002 | Tokieda et al. .................... 704/2 |
| 2003/0154071 A1 * | 8/2003 | Shreve ............................... 704/9 |
| 2003/0191625 A1 | 10/2003 | Gorin et al. |
| 2003/0200079 A1 | 10/2003 | Sakai |
| 2003/0233235 A1 * | 12/2003 | Park .............................. 704/257 |
| 2004/0006560 A1 * | 1/2004 | Chan et al. ......................... 707/3 |
| 2004/0122656 A1 * | 6/2004 | Abir .................................. 704/4 |
| 2004/0148167 A1 * | 7/2004 | Schimmer et al. ............ 704/240 |

(Continued)

OTHER PUBLICATIONS

Al-Onaizan, Y. & Knight, K.; "Machine Transliteration of Names in Arabic Text," Proc. of ACL Workshop on Computational Approaches to Semitic Languages, 2002, 12 pages.*

(Continued)

*Primary Examiner* — Pierre-Louis Desir
*Assistant Examiner* — Fariba Sirjani

(57) ABSTRACT

An approach is described for using a query expressed in a source language to retrieve information expressed in a target language. The approach uses a translation dictionary to convert terms in the query from the source language to appropriate terms in the target language. The approach determines viable transliterations for out-of-vocabulary (OOV) query terms by retrieving a body of information based on an in-vocabulary component of the query, and then mining the body of information to identify the viable transliterations for the OOV query terms. The approach then adds the viable transliterations to the translation dictionary. The retrieval, mining, and adding operations can be repeated one or more or times.

20 Claims, 7 Drawing Sheets

U.S. PATENT DOCUMENTS

| | | | |
|---|---|---|---|
| 2004/0210443 A1* | 10/2004 | Kuhn et al. | 704/276 |
| 2005/0049852 A1 | 3/2005 | Chao | |
| 2005/0065774 A1* | 3/2005 | Doganata et al. | 704/7 |
| 2005/0209844 A1* | 9/2005 | Wu et al. | 704/2 |
| 2006/0009963 A1 | 1/2006 | Gaussier et al. | |
| 2006/0136410 A1 | 6/2006 | Gaussier et al. | |
| 2006/0217962 A1 | 9/2006 | Asano | |
| 2006/0241932 A1* | 10/2006 | Carman et al. | 704/2 |
| 2007/0011132 A1 | 1/2007 | Zhou et al. | |
| 2007/0022134 A1 | 1/2007 | Zhou et al. | |
| 2007/0067285 A1 | 3/2007 | Blume et al. | |
| 2007/0083359 A1* | 4/2007 | Bender | 704/9 |
| 2007/0124133 A1* | 5/2007 | Wang et al. | 704/10 |
| 2007/0136048 A1* | 6/2007 | Richardson-Bunbury et al. | 704/9 |
| 2007/0250306 A1* | 10/2007 | Marcu et al. | 704/9 |
| 2007/0282598 A1 | 12/2007 | Waelti et al. | |
| 2007/0283029 A1* | 12/2007 | Deshpande et al. | 709/230 |
| 2008/0040095 A1* | 2/2008 | Sinha et al. | 704/2 |
| 2008/0126076 A1 | 5/2008 | Ming et al. | |
| 2008/0167856 A1* | 7/2008 | Janakiraman et al. | 704/9 |
| 2009/0024599 A1* | 1/2009 | Tata | 707/4 |
| 2009/0030894 A1* | 1/2009 | Mamou et al. | 707/5 |
| 2009/0055168 A1* | 2/2009 | Wu et al. | 704/10 |
| 2009/0070095 A1 | 3/2009 | Gao | |
| 2009/0132233 A1* | 5/2009 | Etzioni et al. | 704/3 |
| 2009/0198674 A1* | 8/2009 | Custis et al. | 707/5 |
| 2009/0222409 A1* | 9/2009 | Peoples et al. | 707/3 |
| 2009/0319257 A1 | 12/2009 | Blume et al. | |
| 2010/0004925 A1 | 1/2010 | Ah-Pine et al. | |
| 2010/0070521 A1* | 3/2010 | Clinchant et al. | 707/760 |
| 2010/0106484 A1 | 4/2010 | U et al. | |
| 2011/0178792 A1* | 7/2011 | Shi | 704/3 |
| 2011/0307485 A1* | 12/2011 | Udupa et al. | 707/737 |
| 2012/0035914 A1* | 2/2012 | Brun | 704/9 |

OTHER PUBLICATIONS

"Machine Transliteration", (K. Knight and J. Graehl), Proc. of the Conference of the Association for Computational Linguistics (ACL), 1997.*

Och, et al. "A Comparison of Alignment Models for Statistical Machine Translation," Proceedings of the 18th Conference on Computational Linguistics, vol. 2, pp. 1086-1090. Copyright 2000.*

Fujii , et al., "Japanese/English Cross-Language Information Retrieval: Exploration of Query Translation and Transliteration," Computers and the Humanities, vol. 35, No. 4, pp. 389-420, Nov. 2001, retrieved at <<http://citeseerx.ist.psu.edu/viewdoc/summary;jsessionid=820B9AFB5075BED68EA2.0?doi=10.1.1.7.8001>>, 30 pages.

Wu, et al., "Improving English-to-Chinese Translation for Technical Terms Using Morphological Information," Proceedings of the 18th Conference of the Association for Machine Translation in the Americas, retrieved at <<http://www.mt-archive.info/AMTA-2008-Wu-1.pdf>>, Oct. 2008, pp. 202-211.

Kraaij, et al., "Embedding Web-based Statistical Translation Models in Cross-Language Information Retrieval," Computational Linguistics, vol. 29, No. 3, 2003, retrieved at <<http://mediaminer.ict.tno.nl/papers/kraaij-cl-29-3.pdf>>, 37 pages.

Chen, et al., "Parallel Web Text Mining for Cross Language IR," Proceedings of RIAO, 2000, retrieved at <<http://citeseerx.ist.psu.edu/viewdoc/summary?doi=10.1.1.25.7941>>, 16 pages.

Kwok, K.L., "English-Chinese Cross-Language Retrieval based on a Translation Package", Workshop of Machine Translation for Cross Language Information Retrieval, 1999, retrieved at <<http://serv1.ist.psu.edu:8080/showciting;jsessionid=E203FAC897CF5B83059F119CCE78EF73?cid=1105587>>, 8 pages.

Virga, et al., "Transliteration of Proper Names in Cross-Language Applications," SIGIR '03, retrieved at <<http://www.clsp.jhu.edu/people/pvirga/papers/p365-virga.pdf>>, 2003, pp. 365-366.

Abdujaleel, et al., "English to Arabic Transliteration for Information Retrieval: A Statistical Approach," 2002, retrieved at <<http://ciir.cs.umass.edu/pubfiles/ir-261.pdf>>, 7 pages.

Zhou, et al., "Disambiguation and Unknown Term Translation in Cross Language Information Retrieval," Advances in Multilingual and Multimodal Information Retrieval: 8th Workshop of the Cross-Language Evaluation Forum, CLEF 2007, 2008, retrieved at <<http://www.springerlink.com/content/g615h31518316346/fulltext.pdf>>, pp. 64-71.

Virga, et al., "Transliteration of Proper Names in Cross-Lingual Information Retrieval," 2003, retrieved at <<http://www.clsp.jhu.edu/people/pvirga/papers/W03-1508.pdf>>, 8 pages.

Knight, et al., "Machine Transliteration," retrieved at <<http://www.isi.edu/natural-language/mt/transliterate.pdf>>, 8 pages, 1997.

Al-Onaizan, et al., "Machine Transliteration of Names in Arabic Text," Proceedings of the ACL-02 Workshop on Computational Approaches to Semitic Languages, retrieved at <<http://citeseerx.ist.psu.edu/viewdoc/summary?doi=10.1.1.18.2871>>, 2002, 14 pages.

Abduljaleel, et al., "Statistical Transliteration for English-Arabic Cross Language Information Retrieval," Proceedings of the Twelfth International Conference on Information and Knowledge Management, 2003, retrieved at <<http://ciir.cs.umass.edu/pubfiles/ir-293.pdf>>, 8 pages.

Zhou, et al., Ambiguity and Unknown Term Translation is CLIR, retrieved at <<http://www.clef-campaign.org/2007/working_notes/dong_zhouCLEF2007.pdf>>, 2007, 5 pages.

Al-Onaizan, et al., "Translating Named Entities using Monolingual and Bilingual Resources," Proceedings of the 40th Annual Meeting of the Association for Computational Linguistics, Jul. 2002, retrieved at <<http://www.aclweb.org/anthology-new/P/P02/P02-1051.pdf>>, pp. 400-408.

Ballesteros, et al., "Dictionary Methods for Cross-Lingual Information Retrieval," Proceedings of the 7th International Conference on Database and Expert Systems Applications, 1996, retrieved at <<http://citeseerx.ist.psu.edu/viewdoc/download?doi=10.1.1.49.7807&rep=rep1&type=pdf>>, 11 pages.

Chen, et al., "Proper Name Translation in Cross-Language Information Retrieval," Proceedings of the 17th International Conference on Computational Linguistics—vol. 1, 1998, retrieved at <<http://www.aclweb.org/anthology-new/P/P98/P98-1036.pdf>>, pp. 232-236.

Demmer-Fushman, et al., "The Effect of Bilingual Term List Size on Dictionary-based Cross-Language Information Retrieval," retrieved at <<http://citeseerx.ist.psu.edu/viewdoc/download?doi=10.1.1.13.180&rep=rep1&type=pdf>>, 2003, 10 pages.

Fung, Pascale, "A Pattern Matching Method for Finding Noun and Proper Noun Translations from Noisy Parallel Corpora", Proceedings of the 33rd Annual Meeting on Association for Computational Linguistics, 1995, retrieved at <<http://citeseerx.ist.psu.edu/viewdoc/download?doi=10.1.1.56.3467&rep=rep1&type=pdf>>, 8 pages.

Fung, Pascale, "Compiling Bilingual Lexicon Entries from a Non-Parallel English-Chinese Corpus," Proceedings of the 3rd Workshop on Very Large Corpula, 1995, retrieved at <<http://www.aclweb.org/anthology-new/W/W95/W95-0114.pdf>>, pp. 173-183.

He, Xiaodong, "Using Word Dependent Transition Models in HMM based Word Alignment for Statistical Machine Translation," Proceedings of the Second Workshop on Statistical Machine Translation, Jun. 2007, pp. 80-87.

Joshi, et al., "Cross-Lingual Location Search", retrieved at <<http://research.microsoft.com/en-us/groups/adp/acm_2008_crosslingual_location_search.pdf>>, Proceedings of the SIGIR, 2008, 8 pages.

Knight, et al., "Machine Transliteration," Computational Linguistics, 24(4), 1998, retrieved at <<http://www.aclweb.org/anthology-new/J/J98/J98-4003.pdf>>, 14 pages.

Koehn, et al., "Learning a Translation Lexicon from Monolingual Corpora," Unsupervised Lexical Acquisition: Proceedings of the Workshop of the ACL Special Interest Group on the Lexicon (SIGLEX), 2002, retrieved at <<http://www.aclweb.org/anthology-new/W/W02/W02-0902.pdf>>, 8 pages.

McNamee, et al., "Comparing Cross-Language Query Expansion Techniques by Degrading Translation Resources," Proceedings of the 25th Annual International ACM SIGIR Conference on Research and Development in Information Retrieval 2002, pp. 159-166.

Mandl, et al., "How do Named Entities Contribute to Retrieval Effectiveness?," CLEF 2004, LNCS 3491, Springer-Verlag Berlin Heidelberg, 2005, retrieved at <<http://www.springerlink.com/content/8ptg56wyl9bbbngk/fulltext.pdf>>, pp. 833-842.

Mandl, et al., "The Effect of Named Entities on Effectiveness in Cross-Language Information Retrieval Evaluation," Proceedings of the 2005 ACM Symposium on Applied Computing, 2005, pp. 1059-1064.

Munteanu, et al., "Extracting Parallel Sub-Sentential Fragments from Non-Parallel Corpora," Proceedings of the International Conference on Computational Linguistics and the 44th annual Meeting of the ACL, Jul. 2006, pp. 81-88.

Och, et al., "A Systematic Comparison of Various Statistical Alignment Models," Computational Linguistics, vol. 29, No. 1, 2003, pp. 19-51.

Pirkola, et al., "Fuzzy Translation of Cross-Lingual Spelling Variants," Proceedings of the 26th Annual International ACM SIGIR Conference on Research and Development in Informaion Retrieval, 2003, pp. 345-352.

Pirkola, et al., "Dictionary-based Cross-Language Information Retrieval: Problems, Methods, and Research Findings," published in Informational Retrieval 4 (3/4), pp. 209-230, retrieved at <<http://www.info.uta.fi/tutkimus/fire/archive/dictionary_based.pdf>>, 2001, pp. 1-33.

Ponte, et al., "A Language Modeling Approach to Information Retrieval," Proceedings of the 21st Annual International ACM SIGIR Conference on Research and Development in Information Retrieval, 1998, retrieved at <<http://www.computing.dcu.ie/~gjones/Teaching/CA437/p275.pdf>>, pp. 275-281.

Quirk, et al., "Generative Models of Noisy Translations with Applications to Parallel Fragments Extraction," retrieved at <<http://www.mt-archive.info/MTS-2007-Quirk.pdf>>, 2007, 8 pages.

Rapp, Reinhard, "Automatic Identification of Word Translations from Unrelated English and German Corpora," Proceedings of the 37th Annual Meeting of the Association for Computational Linguistics on Computational Linguistics, 1999, pp. 519-526.

Xu, et al., "Empirical Studies on the Impact of Lexical Resources on CLIR Performance," Information Processing and Management, 41, 2005, pp. 475-487.

Zhai, et al., "A Study of Smoothing Algorithms for Language Models Applied to Information Retrieval," ACM Transactions on Information Systems, vol. 22, No. 2, Apr. 2004, pp. 179-214.

Peters, Carol, "What happened in CLEF 2006: Introduction to the Working Notes," 2006, 9 pages.

Porter, M. F., "An algorithm for suffix stripping," Program 14(3), Jul. 1980, pp. 130-137, accessible at <<http://tartarus.org/~martin/PorterStemmer/def.txt>>, 8 pages.

Peters, Carol, "What happened in CLEF 2007? Introduction to the Working Notes", 2007, accessible at <<http://www.clef-campaign.org/2007/working_notes/petersCLEF07_intro.pdf>>, 9 pages.

Li, et al., "Semantic Transliteration of Person Names," Proceedings of the 45th Annual Meeting of the Association of Computational Linguistics, Jun. 2007, pp. 120-127.

Udupa, et al, "Mining Named Entity Transliteration Equivalents from Comparable Corpora," Proceeding of the 17th ACM Conference on Information and Knowledge Management, 2008, pp. 1423-1424.

Och, et al., "A Comparison of Alignment Models for Statistical Machine Translation," Proceedings of the 18th Conference on Computational linguistics—vol. 2, accessible at <<http://www.aclweb.org/anthology-new/C/C00/C00-2163.pdf>>, pp. 1086-1090, Copyright 2000.

Venugopal, et al., "Effective Phrase Translation Extraction from Alignment Models," Proceedings of the 41st Annual Meeting of the Association for Computing Linguistics, Jul. 2003, pp. 319-326.

Vogel, et al., "HMM-Based Word Alignment in Statistical Translation," Proceedings of the 16th Conference on Computational Linguistics—vol. 2, 1996, pp. 836-841.

Och, et al., "Improved Alignment Models for Statistical Machine Translation," 1999, accessible at <<http://citeseerx.ist.psu.edu/viewdoc/summary?doi=10.1.1.14.2316>>, pp. 20-28.

Shinyama, et al., "Named Entity Discovery Using Comparable News Articles," retrieved at <<http://cs.nyu.edu/~sekine/papers/coling04-shinyama.pdf>>, Proceedings of the 20th International Conference on Computational Linguistics, Article No. 848, 2004, 6 pages.

Jiang, et al., "Named Entity Translation with Web Mining and Transliteration," retrieved at <<http://www.ijcai.org/papers07/Papers/IJCAI07-263.pdf>>, International Joint Conferences on Artificial Intelligence (IJCAI) 2007, pp. 1629-1634.

Shao, et al., "Mining New Word Translations from Comparable Corpora," retrieved at <<http://www.comp.nus.edu.sg/~nght/pubs/coling04.pdf>>, Proceedings of the 20th International Conference on Computational Linguistics, Article No. 618, 2004, 7 pages.

Hassan, et al., "Improving Named Entity Translation by Exploiting Comparable and Parallel Corpora," retrieved at <<http://www.computing.dcu.ie/~hhasan/ranlp07.pdf>>, Proceedings of the 2007 Conference on Recent Advances in Natural Language Processing (RANLP, 2007), AMML Workshop, 2007, 6 pages.

Li, et al., "Mining Community Structure of Named Entities from Web Pages and Blogs," retrieved at <<http://www.cs.uic.edu/~xli3/caaw06.pdf >>, AAAI Spring Symposium: Computational Approaches to Analyzing Weblogs '06, 2006, 7 pages.

Sproat, et al., "Named Entity Transliteration with Comparable Corpora," retrieved at <<http://www.mt-archive.info/Coling-ACL-2006-Sproat.pdf >>, Proceedings of the 21st International Conference on Computational Linguistics and 44th Annual Meeting of the ACL, 2006, pp. 73-80.

International Search Report and Written Opinion for PCT/US2009/061352 (corresponding to U.S. Appl. No. 12/255,372), dated Jun. 3, 2010, 12 pages.

Goldwasser, et al., "Active Sample Selection for Named Entity Transliteration," retrieved at <<http://aclweb.org/anthology-new/P/P08/P08-2014.pdf >>, Proceedings of ACL-08: HLT, Short Papers, pp. 53-56.

Bikel, et al., "An Algorithm that Learns What's in a Name," retrieved at <<http://www.cis.upenn.edu/~dbikel/papers/algthatlearns.doc.pdf >>, Machine Learning—Special Issue on Natural Language Learning, vol. 34, Issue 1-3, Feb. 1999, 20 pages.

* cited by examiner

MINING TRANSLITERATIONS FOR OUT-OF-VOCABULARY QUERY TERMS

BACKGROUND

A user may provide a query in a source language with the intent of retrieving information from a collection of documents that are expressed in a target language. To enable this mode of operation, a system may employ a Cross-Language Information Retrieval (CLIR) system. The CLIR system converts the query terms expressed in the source language to their respective counterparts in the target language. For this purpose, the CLIR system may make reference to a dictionary which maps terms in the source language to corresponding terms in the target language. After conversion, the CLIR system can search the collection of documents using the converted query terms.

The dictionary used by the CLIR system typically cannot account for all of the terms that a user may input as a query. For example, proper nouns and other domain-specific terminology represent a wide class of information that is continually evolving. Hence, the dictionary used by the CLIR system cannot keep abreast of such information. Any query term that is not found in the dictionary is referred to herein as an out-of-vocabulary (OOV) query term.

In certain cases, the presence of OOV terms is not a problem. For example, consider the case in which the query is expressed in English, while the collection of documents is expressed in Spanish. If the user inputs a proper name, such as "Richard Nixon," the CLIR system can simply fashion a query that leaves this proper name untranslated. In other cases, however, the source language and the target language have different expressive forms. For example, Hindi (expressed in the Devanagari script) and English (expressed in the Latin script) are characterized by different respective orthographies and phonetic alphabets. In this case, the CLIR system cannot simply pass the original OOV query term as a search term because the documents in the target language cannot be expected to include the unconverted OOV query term.

One known way to address this problem is by providing a machine transliteration (MT) system. An MT system operates by applying phonetic and orthographic transformations on an input string to produce a string in the orthography of the target language. However, this solution is not fully satisfactory. If the MT system provides a transliteration that is merely close to the counterpart term used in the documents being searched, the transliteration that is generated may fail to locate the desired documents.

A failure to properly convert OOV query terms may significantly impact the performance of the CLIR system. Since an OOV term is often (although not necessarily) some type of specialized term, such a term may represent a highly informative part of the query, sometimes pinpointing the focus of the user's search objectives. Therefore, without this term, the query may fail to adequately describe the information being sought by the user.

SUMMARY

An information retrieval system is described for using a query expressed in a source language to retrieve information expressed in a target language. The query may include an in-vocabulary component and an out-of-vocabulary (OOV) component. The in-vocabulary component includes one or more query terms that are present in a translation dictionary. The OOV component includes one or more query terms (referred to as OOV terms) that are not present in the translation dictionary.

In operation, the system retrieves a body of information based on the in-vocabulary component of the query. In one case, the body of information may comprise one or more "top result" documents that match the in-vocabulary component of the query. For each OOV term in the query, the system then mines the body of information to determine one or more viable transliterations for the OOV term. The system then updates the translation dictionary by adding the identified transliterations to the translation dictionary. The system can then use the updated translation dictionary to retrieve another body of information (e.g., another set of "top result" documents).

The system can repeat the above-described process one or more times. For instance, the system can mine the newly retrieved body of information to extract additional viable transliterations for the OOV terms in the query. The system can then add the additional transliterations to the translation dictionary and retrieve another body of information based on the updated translation dictionary.

The above approach can be manifested in various types of systems, methods, computer-readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for using queries expressed in a source language to retrieve information expressed in a target language. The approach uses mining analysis to extract viable transliterations for out-of-vocabulary (OOV) query terms from a retrieved body of information (e.g., from top results returned by a search operation).

This disclosure is organized as follows. Section A describes illustrative systems for retrieving information through the use of mining analysis. Section B describes illustrative methods for performing the same function. Section C describes illustrative processing functionality that can be used to implement any aspect of the features described in Sections A and B.

Figure 7:
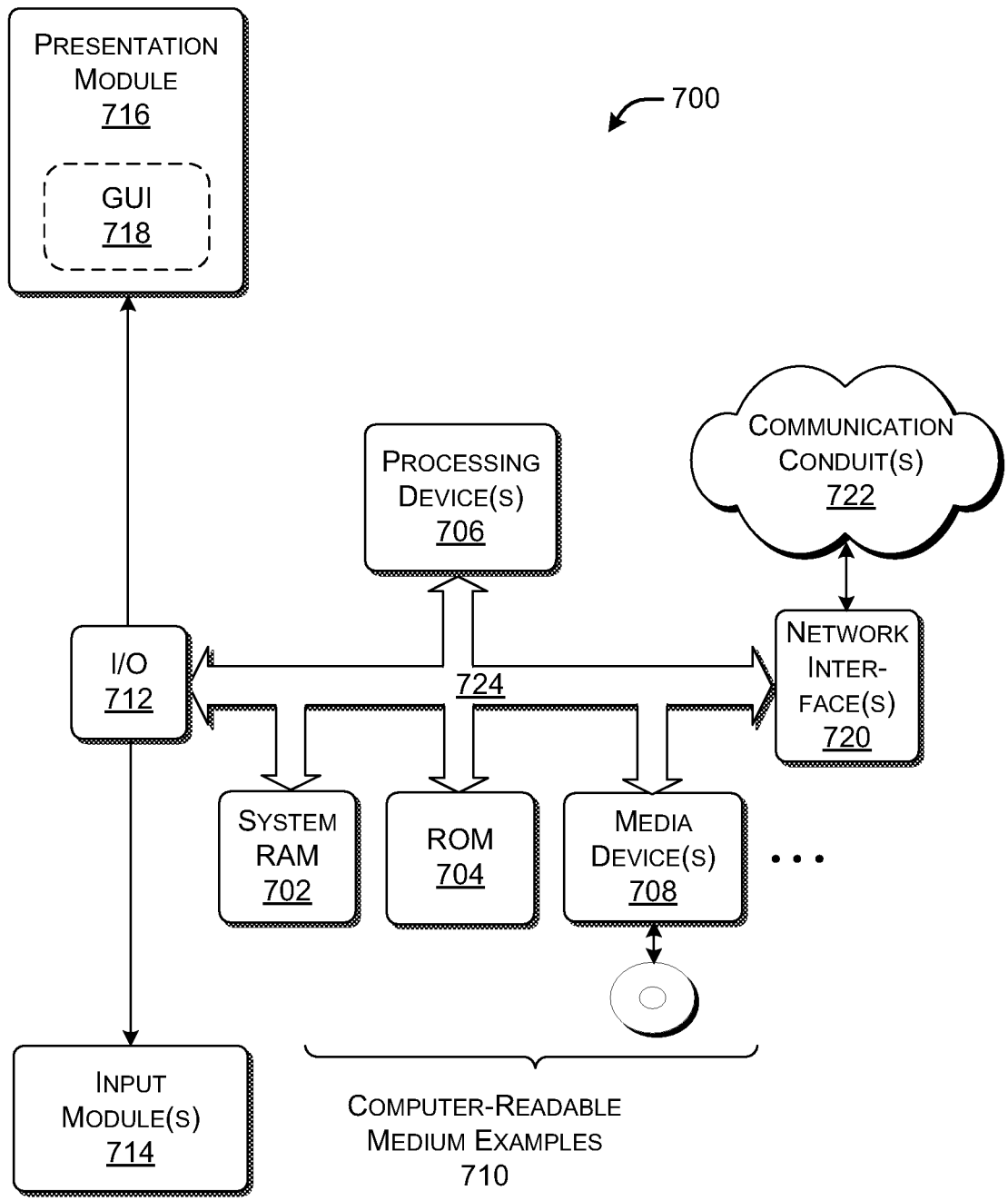
FIG. 7 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware, firmware, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 7, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, firmware, hardware, manual processing, etc., or any combination of these implementations.

As to terminology, the phrase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components, or a combination of discrete logic components and computer-readable instructions.

A. Illustrative Systems

Figure 1:
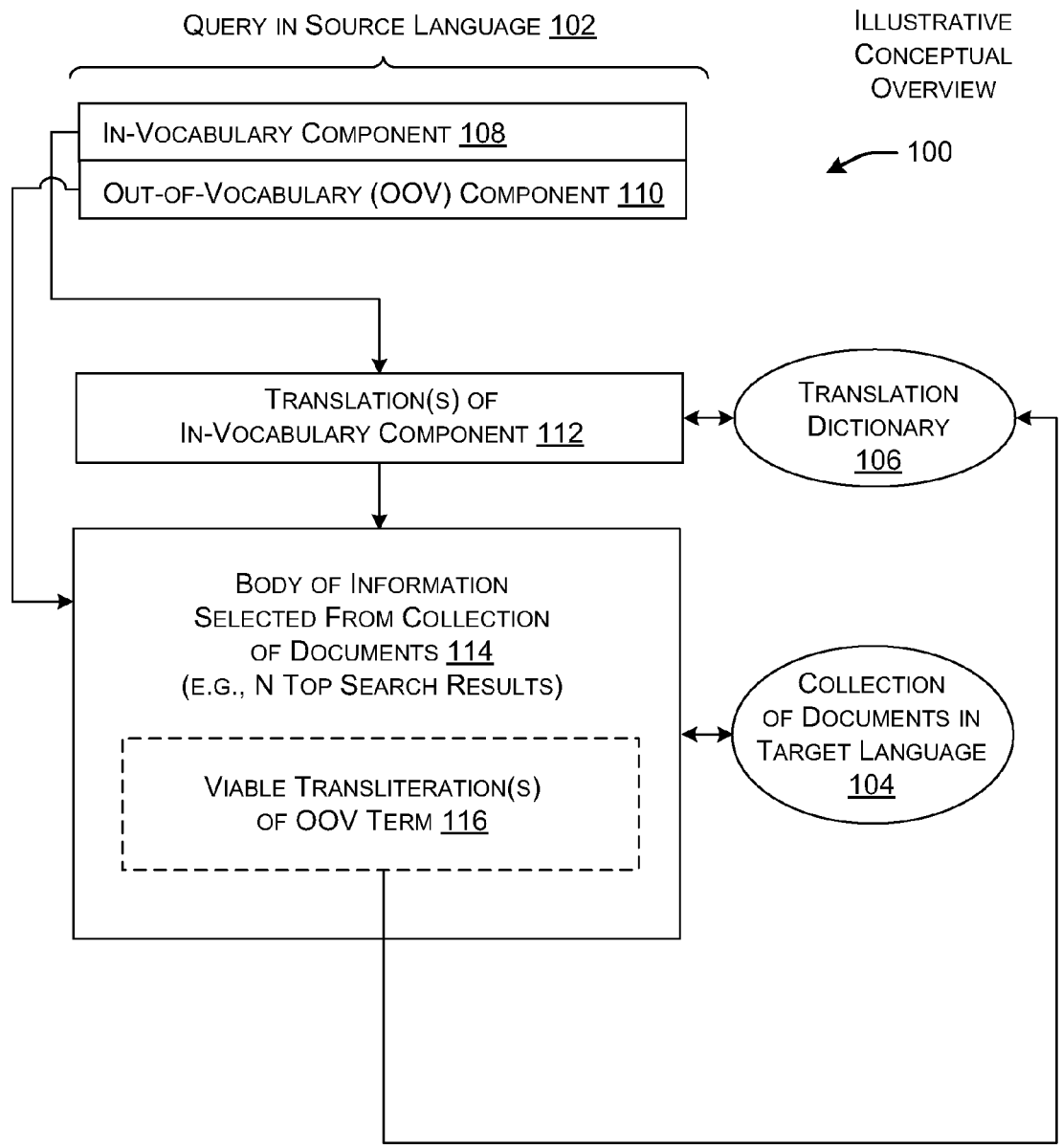
FIG. 1 shows an illustrative approach for retrieving information by performing mining analysis to determine viable transliterations for any out-of-vocabulary (OOV) terms in an input query.

FIG. 1 is a conceptual overview 100 of an approach that a cross-language information retrieval (CLIR) system can take to retrieve information. In this approach, a user (or some other entity) provides a query 102 to a CLIR system. The query is expressed in a source language. The CLIR system converts the query into a target language and then uses the converted query to retrieve information expressed in the target language.

The term "language" encompasses any manner of expressing linguistic information. In one illustrative (but non-limiting) case, the source language and the target language may correspond to different natural languages. For example, the query 102 may be expressed in Japanese, while the collection of documents 104 may be expressed in English. A conversion of textual information from one language to another can be broadly referred to as translation.

In the examples emphasized in this explanation, the source language and the target language have different expressive forms. The term "form" should be construed broadly as used herein. In one example, the source language and the target language can embody different forms by using different orthographies. In addition, or alternatively, the two languages can embody different forms by using different phonetic alphabets. The orthography of a language refers to the writing system used to express the language. The phonetic alphabet of a language refers to the characters used to express sounds in the language. For example, Hindi (expressed in the Devanagari script) and English (expressed in the Latin script) are characterized by different orthographies and different phonetic alphabets. A conversion of textual information from one form of expression to another is referred to as transliteration, which can be viewed as a type of translation.

The information that is retrieved can be extracted from any source or combination of sources. In one illustrative application, the purpose of the CLIR system is to extract one or more documents from a collection of documents 104. For example, the collection of documents 104 may represent a data store (or multiple data stores) of documents expressed in the target language. The term "document" should be broadly construed as used herein. In one case, a document may refer to any type of record that includes one or more words pertaining to a topic. In one illustrative case, a document may include multiple portions, such as, without limitation, a title portion, a summary portion, a descriptive body portion, and so on. A document may also include other types of information, such as image information, audio information, video information, and so on.

The query 102 can likewise assume different modes of expression. In one case, each query may include one or more query terms. In one case, a query term refers to a single string of textual information (e.g., a single word or acronym). In another case, a query term may refer to multiple strings of textual information (e.g., a multi-word phrase). Any query can include single-word query terms, multi-word query terms, or a mix of different types of query terms. To facilitate discussion, however, the examples which follow assume that each query term corresponds to a single string of textual information.

In one case, a user may manually input the query, e.g., by typing in the characters that comprise the query or by entering the query using some other type of input device. In another case, the user (or some other entity) can supply a pre-formed query. For example, the user can select a query document that serves as a query; that is, this query document contains multiple query terms that collectively serve as a query. In this example, the query document can include multiple fields or sections. For example, a query document may have a title section and a body section. The body section, in turn, can be partitioned into multiple sections. In this example, the CLIR system operates by using the query terms expressed in all of the sections, or by using the query terms that appear in a selected individual section (or sections), to retrieve desired information from the collection of documents 104. Still other interpretations of the query 102 and the collection of documents 104 are possible.

The CLIR system uses a translation dictionary 106 to convert the query 102 from the source language into the target language. The translation dictionary 106 performs its conversion function by using an input query term to search for a corresponding term in the source language within the translation dictionary 106; if found, it then outputs a target language term that is associated with the identified source language term.

The translation dictionary 106 cannot account for all possible query terms that can be expressed in the source language. For instance, proper nouns and other domain-specific terms represent a broad class of specialized information. Furthermore, this class of information is continually evolving. Hence, the translation dictionary 106 cannot expect to store the complete universe of possible query terms that may be found in the query 102.

As such, the query 102 can be viewed as potentially having an in-vocabulary component 108 and an out-of-vocabulary (OOV) component 110. The in-vocabulary component 108 refers to one or more query terms that are present in the translation dictionary 106. The OOV component 110 refers to one or more out-of-vocabulary (OOV) query terms that are not present in the translation dictionary 106.

The approach shown in FIG. 1 addresses the scenario in which the query 102 includes both the in-vocabulary component 108 and the OOV component 110. More specifically, the purpose of the approach shown in FIG. 1 is to determine, if possible, at least one viable transliteration for each OOV query term in the query 102. To perform this task, the CLIR system first uses the translation dictionary 106 to convert the in-vocabulary query terms of the query 102 to their counterpart translations 112 in the target language. The CLIR system then uses these translations 112 as search terms to retrieve a body of information 114 from the collection of documents 104 expressed in the target language. In one case, the body of information 114 corresponds to one or more documents. These documents may represent the top-ranking documents that are identified by a document retrieval module (not shown in FIG. 1) upon searching the collection of documents 104. In general, the body of information 114 includes textual information made up of a plurality of words.

The CLIR system then commences a mining analysis phase of its operation. Here, for each OOV query term in the query, the CLIR system examines each qualifying word in the body of information 114 to determine whether this word is a viable transliteration for the OOV query term. To perform this task, the CLIR system uses a transliteration similarity model to assess the extent to which the word may be considered a viable transliteration of the OOV query term. At the end of the mining analysis, the CLIR system may have identified one or more viable transliterations 116 for the OOV query terms in the query 102.

In an updating operation, the CLIR system adds the newly discovered viable transliterations 116 to the original translation dictionary 106. This has the effect of redefining the in-vocabulary component 108 of the query 102. In other words, the in-vocabulary component 108 may now encompass additional query terms in the query 102 because the translation dictionary 106 has been modified to include those additional query terms.

The CLIR system can now repeat the retrieval operations with respect to the newly defined in-vocabulary component 108. That is, the CLIR system can again determine the translations 112 of the in-vocabulary component 108. The CLIR system can then use the translation 112 as a search query to retrieve another body of information 114. In one environment, the other body of information 114 may comprise another set of top result documents. At this juncture, the information retrieval process may be complete; the newly retrieved body of information may constitute an answer to the user's query.

Alternatively, the CLIR system can mine the newly retrieved new body of information 114 to extract additional viable transliterations of the original OOV terms. The CLIR system can add these new transliterations to the translation dictionary 106, upon which the CLIR system can repeat the entire cycle one or more additional times. At the termination of the process, if the process works in a desired manner, the last-retrieved collection of documents will represent a suitable answer to the user's query.

In summary, the CLIR system extracts transliterations from top-ranking search results in one or more iterations. That is, the process finds these transliterations in the existing body of information 114, rather than generating them from "scratch." By virtue of this extraction, the CLIR system can provide transliterations which are likely to match the actual words and phrases that appear in the collection of documents 104 that are being searched, compared to, for example, the case in which a machine transliteration (MT) system generates all of the transliterations for the OOV terms. In the case of the use of an MT system, there is no guarantee that a generated transliteration is present in the collection of documents 104 being searched; the generated transliteration may be close to, but not the same as, the actual transliteration which appears in the collection of documents 104 being searched.

The approach shown in FIG. 1 is based on two base hypotheses. A first hypothesis assumes that the transliteration(s) for an OOV term can be found in the documents that are relevant to the query 102 as a whole (e.g., as reflected by the in-vocabulary component 108 of the query 102). A second hypothesis assumes that, if a viable transliteration is present in some of the relevant documents, it is also present in other relevant documents.

Figure 2:
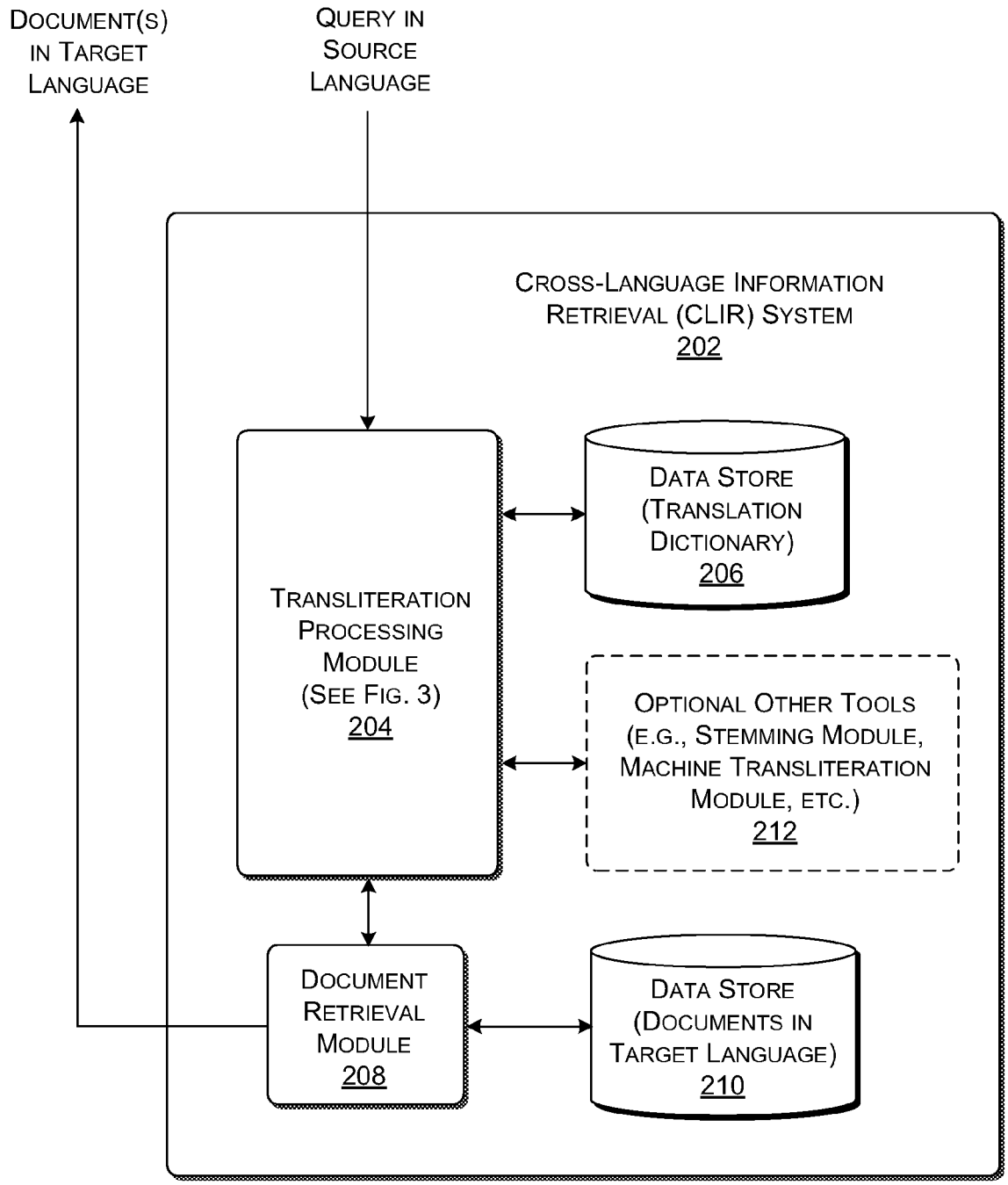
FIG. 2 shows an illustrative cross-language information retrieval (CLIR) system for retrieving information using the approach of FIG. 1.

FIG. 2 shows one type of cross-language information retrieval (CLIR) system 202 that can implement the concept set forth in FIG. 1. The CLIR system 202 can be implemented by one or more computing devices, or by discrete hardware components, etc., or by some combination thereof. The features of the CLIR system 202 can be provided at a single location or can be distributed over plural locations. Further, the features of the CLIR system 202 can be administrated by a single entity or plural cooperating entities.

In a local mode of operation, a user (or other entity) may directly interact with the CLIR system 202 as a local resource. For example, the CLIR system 202 may represent logic that is implemented by a user's personal computer, laptop computer, mobile telephone, game console device, set-top device, or other type of local computer device. In a remote mode of operation, a user (or other entity) may interact with the CLIR system 202 as a remote resource. For example, the CLIR system 202 may represent a network-accessible resource implemented by one or more server computers and other equipment, and a user may interact with the CLIR system 202 via the Internet or other type of network or combination of networks. In either case, the documents in the target language to be searched can be provided at a location that is local with respect to the user, remote with respect to the user (e.g., as stored in one or more network-accessible databases), or some combination thereof.

The user may interact with the CLIR system 202 by submitting a query to the CLIR system 202. The CLIR system 202 responds by providing a body of information which matches the query. The query can take any form, as described above. The query generally includes a collection of query terms. Likewise, the information returned by the CLIR system 202 can take a variety of forms. In the example of FIG. 2, the body of information represents one or more documents which match the user's query.

The CLIR system 202 includes a transliteration processing module 204. The transliteration processing module 204 performs the core tasks associated with converting the query terms in the query from the source language to the target language. To perform these tasks, the transliteration processing module 204 makes reference to a data store 206 that provides a translation dictionary. The translation dictionary provides a collection of words in the source language, along with corresponding words in the target language. As described above, the translation dictionary cannot store all possible terms that may appear in the query as input. To repeat, query terms that appear in the translation dictionary are referred to as in-vocabulary query terms, while query terms that are not present in the translation dictionary are referred to as OOV query terms.

One function that the transliteration processing module 204 performs is to convert the in-vocabulary query terms in the query to corresponding terms in the target language using the translation dictionary. Another function that the transliteration processing module 204 performs is to perform a mining analysis operation to extract viable transliterations for OOV query terms in the query.

The transliteration processing module 204 also interacts with a document retrieval module 208. The document retrieval module 208 can be administered by the same entity that administers the transliteration processing module 204, or by a different entity. Further, the document retrieval module 208 can correspond to a component that is local or remote (or distributed as both local and remote) with respect to the transliteration processing module 204. The purpose of the document retrieval module 208 is to retrieve documents (or more generally, information) from a data store 210 based on the query terms provided by the transliteration processing module 204. The data store 210 provides a collection of documents in the target language. The document retrieval module 208 can use any type of document ranking algorithm to retrieve documents based on a submitted search.

In operation, the transliteration processing module 204 first interacts with the document retrieval module 208 to perform mining analysis (as summarized above with respect to FIG. 1). In a culminating iteration, the transliteration processing module 204 interacts with the document retrieval module 208 to retrieve the final set of documents that match the query input by the user (and which hopefully satisfy the search objectives of the user).

The transliteration processing module 204 can also interact with one or more optional supplemental tools 212. One such optional tool is a stemming module. The stemming module identifies the stem of a query term (e.g., by removing prefixes and/or suffixes, if present). The transliteration processing module 204 can then operate on the stem version of the query term. The stemming operation reduces the likelihood that the grammatical form in which the query term is received will negatively impact the performance of the transliteration processing operation.

Another optional tool is a machine transliteration (MT) module. The MT module can use any type of algorithm to dynamically generate transliterations of OOV terms. The transliteration processing module 204 can rely on the MT module in different ways or different combination of ways. In one scenario, the transliteration processing module 204 can use the MT module to generate a transliteration for any OOV term that cannot be successfully processed using the above-described mining analysis. In this case, the transliterations fed to the document retrieval module 208 may be a combination of transliterations produced by mining analysis and transliterations produced by the MT module. In another scenario, the transliteration processing module 204 can use the MT module to generate a transliteration of an OOV term. That generated transliteration, along with the in-vocabulary component of the query, can then be used to retrieve one or more top-ranking documents. The transliteration processing module 204 then mines the documents with the goal of retrieving additional viable transliterations for the OOV term. There are still other ways in which the transliteration processing module 204 and the MT module can interact and/or complement each other.

Figure 3:
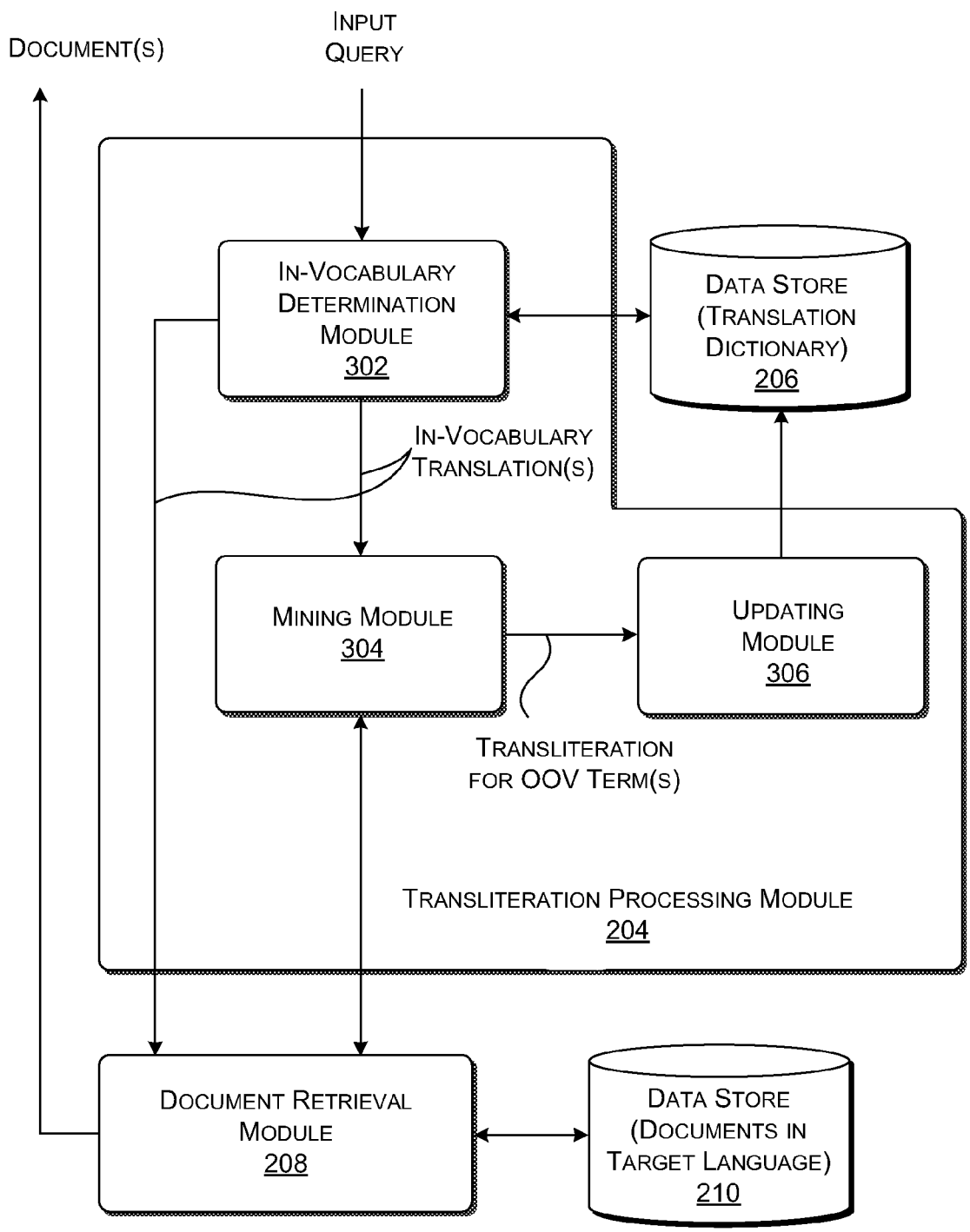
FIG. 3 shows additional illustrative detail regarding a transliteration processing module for use in the CLIR system of FIG. 1.

FIG. 3 shows additional detail regarding one illustrative implementation of the transliteration processing module 204. The transliteration processing module 204 includes, or can be conceptualized to include, three modules for performing respective sub-functions. To begin with, an in-vocabulary determination module 302 identifies the query terms in the query which are included in the translation dictionary (e.g., stored in data store 206). In other words, the in-vocabulary determination module 302 identifies the in-vocabulary component of the query and the OOV component of the query. The in-vocabulary determination module 302 also interacts with the translation dictionary to retrieve the translation counterparts of the in-vocabulary query terms.

A mining module 304 determines viable transliterations for the OOV query terms in the OOV component of the query. It performs this task by using the in-vocabulary component of the query to search the collection of documents in the target language (e.g., stored in data store 210). It then extracts viable transliterations from the top results provided by this search. One illustrative manner in which the mining analysis can be performed will be described in greater detail in Section B.

An updating module 306 adds the viable transliterations identified by the mining module 304 to the translation dictionary (e.g., stored in data store 206). This enables the in-vocabulary determination module 302 to redefine the in-vocabulary portion of the query, enabling the retrieval of new search results. The mining module 304 and the updating module 306 can then be called on to extract additional viable transliterations from the new search results and add these additional transliterations to the translation dictionary. This process can be repeated any number of times depending on environment-specific considerations.

In FIGS. 2 and 3, the mining analysis is performed on the same body of documents (e.g., in data store 210) from which the ultimate answer to the query is extracted. However, in another implementation, the mining analysis can be performed on a first body of information and the answer can be extracted from a second body of information. For example, the mining analysis can be performed by executing an Internet-wide search to determine viable transliterations for OOV terms in the query. The ultimate answer to the query can be extracted from a target database or the like. The target database may (or may not) be encompassed by the search(es) performed in the mining analysis phase.

B. Illustrative Processes

Figure 4:
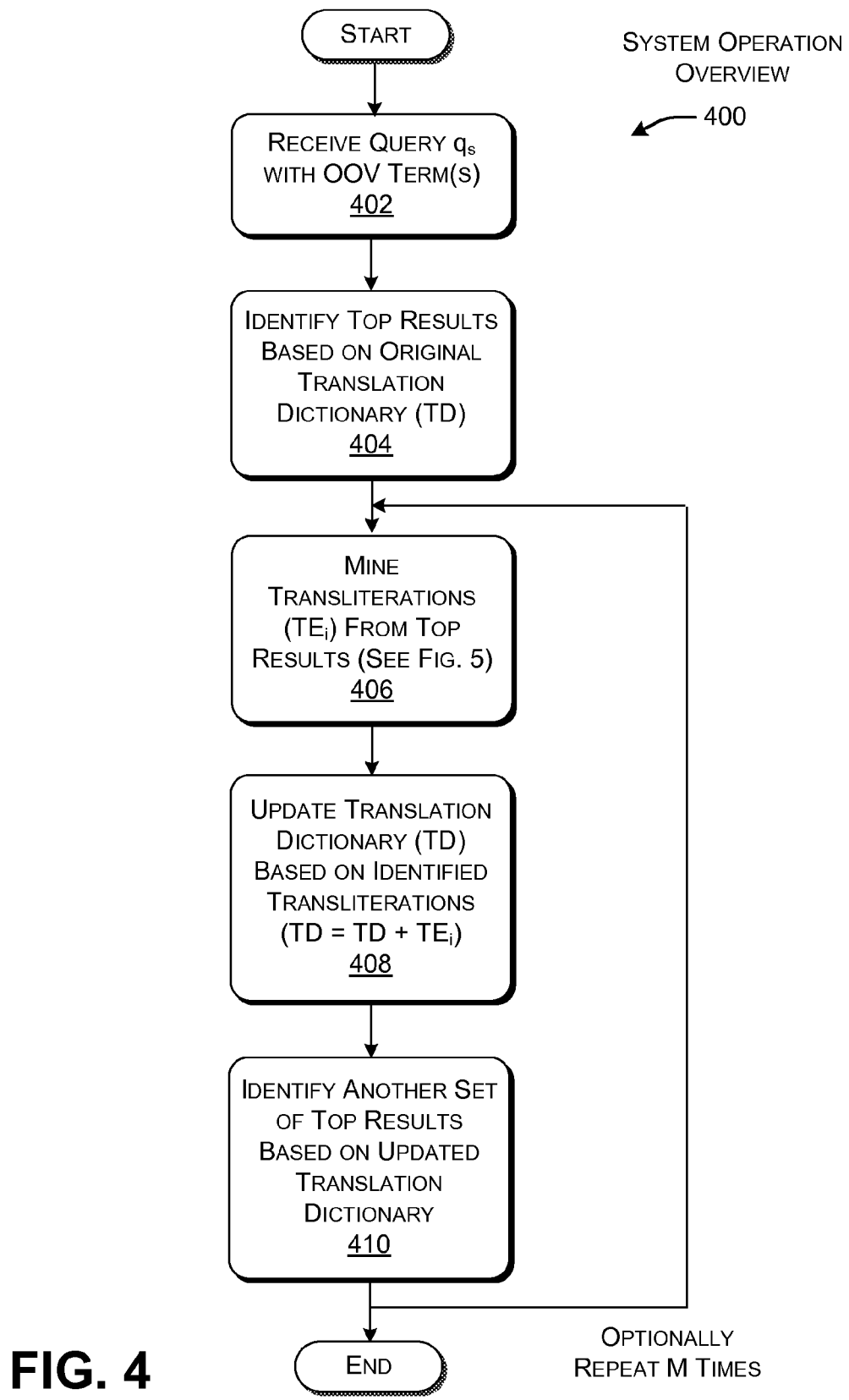
FIG. 4 shows an overview of an illustrative procedure for retrieving information based on the approach of FIG. 1.

FIG. 4 shows a procedure 400 which provides an overview of the operation of the CLIR system 202 of FIG. 2 (or some other type of CLIR system that embodies the concepts of FIG. 1). Since the principles underlying the operation of the CLIR system 200 have already been described in Section A, certain operations will be addressed in summary fashion in this section.

In block 402, the CLIR system 202 receives a query $q_s$ in the source language. In this particular instance, assume that the query includes an in-vocabulary component including one or more in-vocabulary query terms, and an OOV component including one or more OOV query terms.

In block 404, the CLIR system 202 uses the in-vocabulary component of the query to identify top results. In one case, the top results may comprise the N top-ranking documents returned by the document retrieval module 208.

Figure 5:
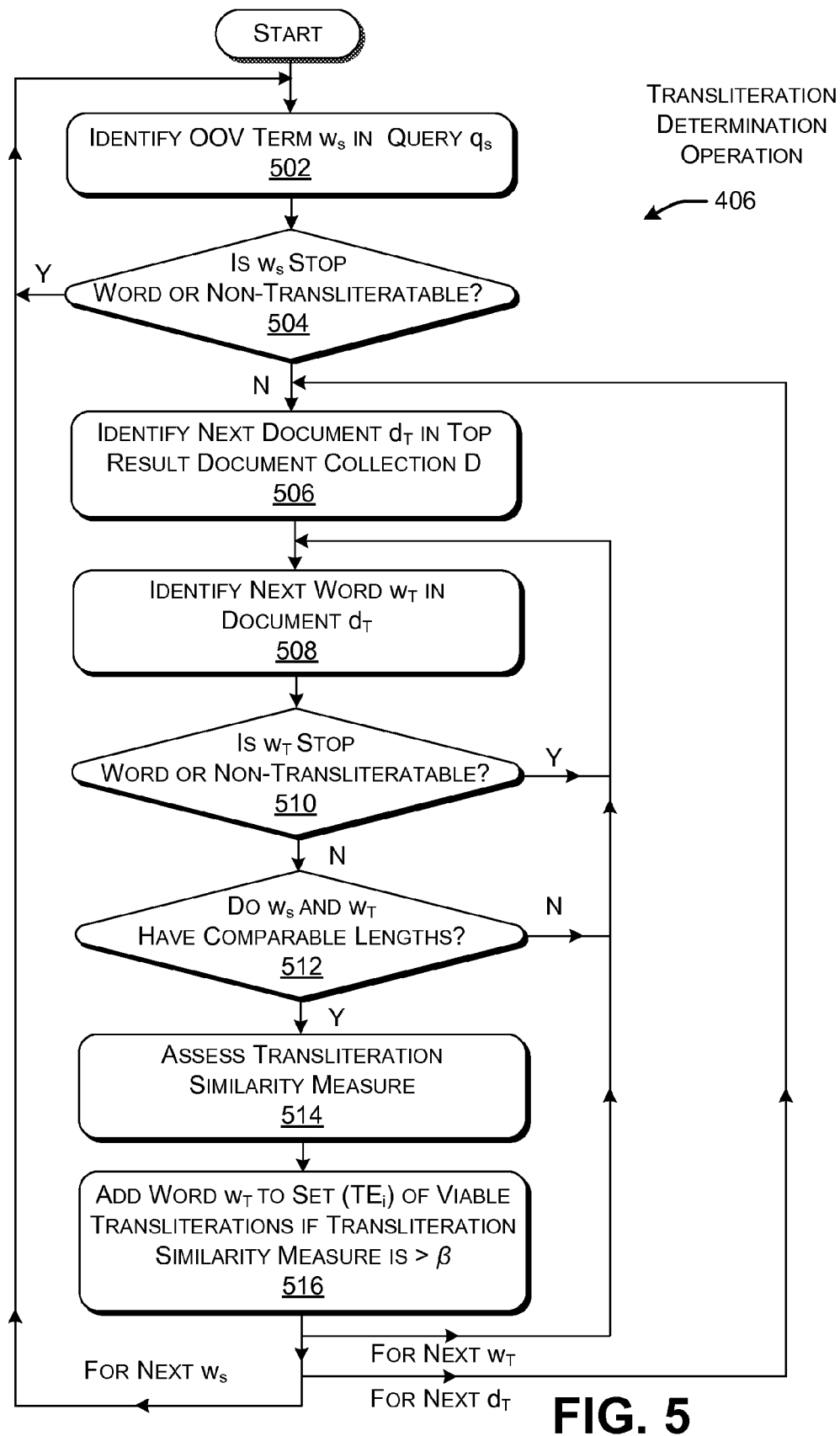
FIG. 5 shows an illustrative procedure for performing transliteration similarity analysis within the procedure of FIG. 4.

In block 406, the CLIR system 202 mines the top results for the presence of viable transliterations of the OOV query terms. FIG. 5 provides additional details regarding one technique for identifying these viable transliterations.

In block 408, the CLIR system 202 updates the translation dictionary by adding the viable transliterations identified in block 406 to the translation dictionary.

In block 410, the CLIR system 202 uses the updated translation dictionary to identify another set of top results. The loop shown in FIG. 4 indicates that blocks 406, 408, and 410 can be repeated any number of times to ensure that suitable transliterations for the OOV terms have been selected. The CLIR system 202 can vary the number of top results that it returns with each iteration. For example, in a first search operation, the CLIR system 202 can identify N top-ranking document. In a second search operation, the CLIR system 202 can identify M top-ranking documents, where, in one case, N>M.

In a final retrieval operation, the document(s) that are retrieved constitute an answer to the query that has been submitted. In other words, if the search is successful, the documents in the final top results will provide information that is relevant to the user's query.

FIG. 5 provides additional illustrative details regarding the mining analysis operation performed in block 406 of FIG. 4.

In block 502, the CLIR system 202 identifies the first (or more generally, the next) OOV query term $w_s$ for consideration.

In block 504, the CLIR system 202 determines whether the query term $w_s$ is a stop word or is considered non-transliteratable. A stop word refers to a word that serves some functional purpose within the query (such as a logical operator), and is thus unlikely to represent a content-bearing query term. A non-transliteratable query term refers to a query term is considered a poor candidate for transliteration for any one or more application-specific reasons. For instance, the CLIR system 202 may define a query term as non-transliteratable if its length is below a prescribed threshold length (such as, without limitation, three characters). In another implementation, a discriminative classifier or other type of processing module can be used to determine whether a term is non-transliteratable based on any combination of features. For instance, the discriminative classifier can make its determination based on various features associated with the word itself, various features associated with the context in which the word is used within the query, and so on. If block 504 is answered in the affirmative for any reason, then the CLIR system 202 returns to block 502 to examine the next OOV query term $w_s$.

Presuming that the query term $w_s$ can be processed, the flow continues with block 506. Here, the CLIR system 202 identifies the first (or more generally, the next) document $d_t$ in the collection of documents D that constitutes the top results returned by the document retrieval module 208. Each document contains a plurality of words.

In block 508, the CLIR system 202 begins processing the document $d_t$ by examining the first (or more generally, the next) candidate word $w_t$ within the document $d_t$.

In block 510, the CLIR system 202 determines whether the candidate word $w_t$ is a stop word or is non-transliteratable.

The same criteria discussed with respect to block 504 apply to block 510. For instance, a candidate word $w_t$ may be determined to be non-transliteratable if its length is below a prescribed threshold. Alternatively, a discriminative classifier or other type of processing module can be used to assess whether the word $w_t$ under consideration is non-transliteratable based on various features associated with the word itself, various features associated with the context in which the word appears within the document $d_t$, and so on. If block 510 is answered in the affirmative, then the CLIR system 202 returns to block 508, whereupon the CLIR system 202 examines the next candidate word $w_t$ in the document $d_t$.

Presuming that block 510 is answered in the negative, the flow advances to block 512. Here, the CLIR system 202 determines whether the OOV term $w_s$ under consideration and the candidate word $w_t$ under consideration have comparable lengths. The two strings have comparable lengths if the lengths differ from each other by no more than a prescribed number of characters. If block 512 is answered in the negative, then the CLIR system 202 returns to block 508, whereupon the CLIR system 202 examines the next candidate word $w_t$ in the document.

If block 512 is answered in the affirmative, then the flow advances to block 514. Here, the CLIR system 202 computes (using measure-computing logic) a transliteration similarity measure between the query term $w_s$ under consideration and the candidate word $w_t$ under consideration. The transliteration similarity measure provided in block 514 is used to determine whether the word $w_t$ is a viable transliteration of the OOV query term $w_s$.

Any algorithm (or combination of algorithms) can be used to compute the transliteration similarity measure. According to one technique, the following equation can be used to determine the transliteration similarity measure using a statistical transliteration model:

$$P(t_1^m \mid s_1^n) = \sum_A \prod_{j=1}^m p(a_j \mid a_{j-1}, s_{a_{j-1}}) p(t_j \mid s_{a_j}, t_{j-1})$$

This equation measures the similarity between two strings, a target string t and a source string s. The string t has m characters (1 to m), while the string s has n characters (1 to n). The symbol A, associated with alignment elements $a_j$, denotes a manner in which the string t is positionally aligned with the string s. In the context of the present application, the word $w_t$ under consideration can be substituted for the string t, and the OOV query term $w_s$ under consideration can be substituted for the string s. Using this equation, the transliteration similarity measure of the pair $(w_s, w_t)$ is log $P(w_t|w_s)$, appropriately scaled.

The above equation can be characterized as a type of hidden markov model (HMM). More specifically, the equation represents a character-level hidden alignment model that makes use of a rich local context in both the transition and emission models (compared to a classic HMM). The transition probability depends on both the jump width and the previous source character. The emission probability depends on the current source character and the previous target character. The transition and emission models are not affected by data sparsity. Instead of using any single alignment of characters in the pair $(w_s, w_t)$, the equation operates by marginalizing over all possible alignments.

The parameters of the model can be estimated by conducting a learning operation with respect to a training set of transliteration pairs. In one technique, the expectation-maximization (EM) algorithm can be used to iteratively estimate the model parameters.

As stated above, other algorithms can be used to assess the transliteration similarity measure in block 514. In another technique, a classic HMM model can be used to assess the transliteration similarity measure. In another technique, the algorithm described by Xiaodong He can be used, as described in He, X., "Using Word Dependent Transition Models in HMM based Word Alignment for Statistical Translation," *Proceedings of the Second ACL Workshop on Statistical Machine Translation,* 2007, pp. 80-87. He's work, in turn, is based on previous work by Stephan Vogel and Hermann Ney, such as Vogel, S., et al., "HMM-Based Word Alignment in Statistical Translation," *Proceedings of the 16th conference on Computational linguistics,* Vol. 2, pp. 836-841. In another technique, a discriminative classifier module can be used to assess the extent of transliteration similarity. The discriminative classifier module can be used by itself or in conjunction with another type of model, such as the statistical transliteration model defined by the equation given above. Still other techniques and combination of techniques can be used.

In block 516, the CLIR system 202 determines whether the transliteration similarity measure assessed in block 514 meets a prescribed criterion or plural prescribed criteria. For instance, the CLIR system 202 can determine (using comparison logic) whether the transliteration similarity measure is greater than a prescribed threshold β. If so, the CLIR system 202 will consider the word under consideration $w_t$ as a viable transliteration and then add it to the translation dictionary.

After processing the current word $w_t$ in the above manner, the flow in FIG. 5 identifies a next word $w_{t+1}$ for processing (in block 508). If the word being processed is the last word in the document, then the flow advances to block 506, in which the next document $d_{t+1}$ is identified for processing. If the document being processed is the last document, then the flow advances to block 502, in which the next query term $w_{s+1}$ is identified for processing.

Figure 6:
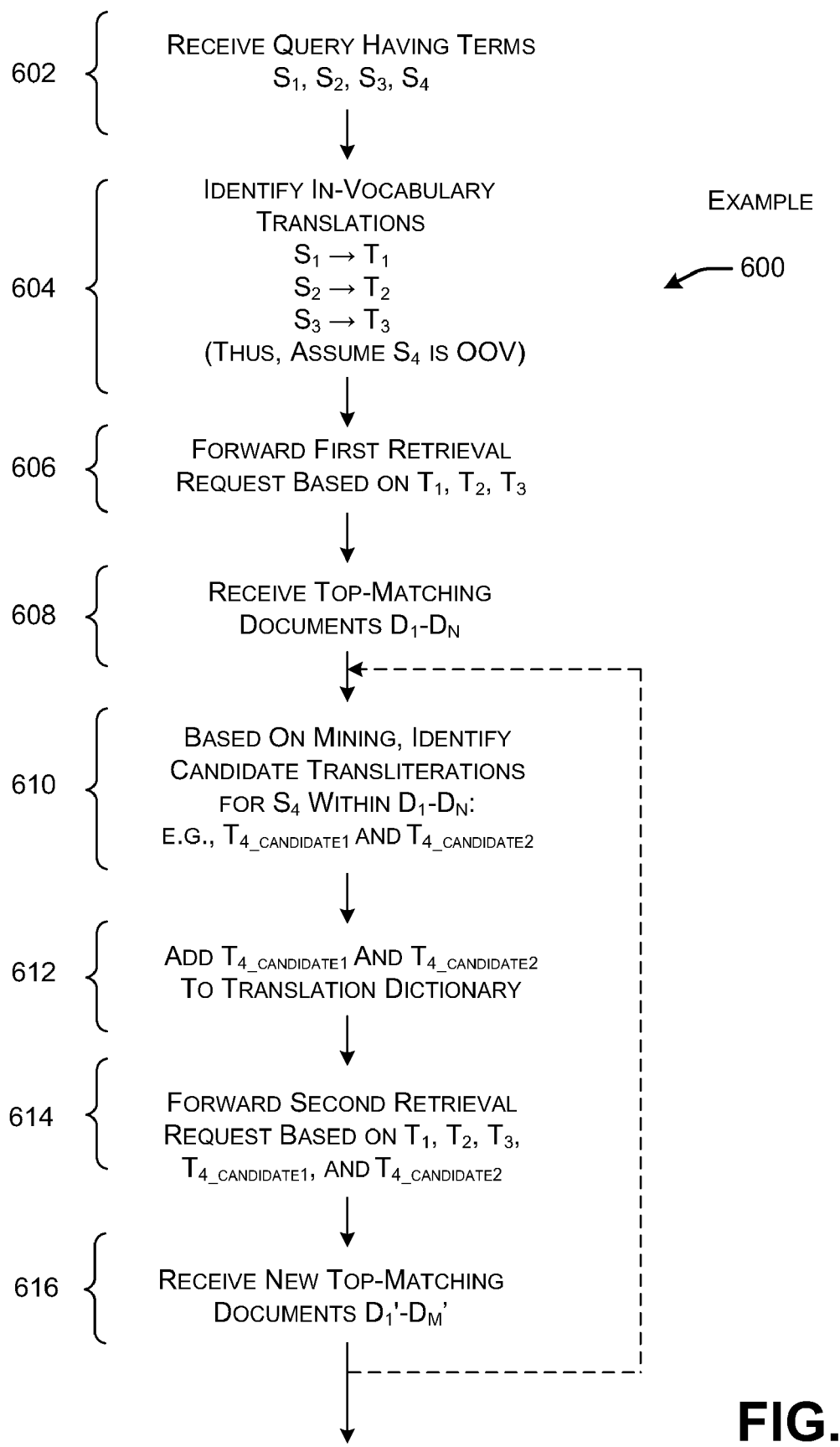
FIG. 6 shows an example of the application of the procedures of FIGS. 4 and 5.

Advancing to FIG. 6, this figure shows an example of the application of the procedure 400 described in FIGS. 4 and 5.

In operation 602, the CLIR system 202 receives a hypothetical query in a source language having four query terms, generically referred to as terms $S_1$, $S_2$, $S_3$, and $S_4$. In practice, some actual queries may have many more query terms; the example shown in FIG. 6 is a simplified scenario that is presented for the purpose of explanation.

In operation 604, the CLIR system 202 determines whether the query terms are present in the translation dictionary. In this merely illustrative case, assume that query terms $S_1$, $S_2$, and $S_3$ are present in the translation dictionary. These terms map to corresponding terms in the target language, $T_1$, $T_2$, and $T_3$, respectively. Assume that query term $S_4$ is not present in the translation dictionary, and is thus considered an OOV query term.

In operation 606, the CLIR system 202 forwards a search request based on the in-vocabulary query terms identified in the translation dictionary, namely terms $T_1$, $T_2$, and $T_3$.

In operation 608, the CLIR system 202 receives N top-matching documents in response to the search, namely documents $D_1$-$D_N$.

In operation 610, the CLIR system 202 performs mining analysis on each of the words in documents $D_1$-$D_N$ to identify viable transliterations for the OOV query term, namely $S_4$. In this case, presume that the CLIR system 202 identifies two viable transliterations, namely $T_{4\_candidate1}$ and $T_{4\_candidate2}$.

In operation 612, the CLIR system 202 adds the two viable transliterations identified in operation 610 to the translation dictionary.

In operation 614, the CLIR system 202 repeats its search operation. In this case, the search is performed based on the updated translation dictionary, providing search terms of $T_1$, $T_2$, $T_3$, and $T_{4\_candidate1}$ and $T_{4\_candidate2}$.

In operation 616, the CLIR system 202 receives a new set of top-ranked documents $D_1'$-$D_M'$. At this juncture, the algorithm may terminate. The top-ranked documents may constitute the answer to the user's query. In another case, the CLIR system 202 can repeat the mining analysis and updating operation of blocks 610 and 612 with respect to the new top results. This operation may result in the identification of one or more other viable transliterations for the OOV query term $S_4$, such as $T_{4\_candidate3}$. In general, the operations 610-616 can be repeated any number of times.

In one case, the transliterations discovered in subsequent mining operations may have higher transliteration similarity measures than the transliterations found in a previous mining operation (or plural previous mining operations). Different environment-specific considerations can be used to determine which transliterations are to be added to the translation dictionary for use in the final retrieval operation. In one case, the CLIR system 202 may add all transliterations that it finds provided that they are above a prescribed threshold β. In another case, the CLIR system 202 may retain only a predetermined number of the highest-scoring transliterations.

Consider the following concrete, yet simplified, example. Assume that the user inputs the query "Eight, Gold, Beijing, Phelps" in the Hindi language, with the intent of retrieving documents from an English language database regarding the swimmer Michael Phelps. Assume that the first three terms are present in the translation dictionary, while the fourth, "Phelps," is not. Thus, Phelps is an OOV term. In this case, it is reasonable to assume that a first search query based on "Eight, Gold, Beijing" might retrieve one or more matching documents that contain the name "Phelps" therein. In this case, the mining analysis would pick out the matching transliterations from the search results and add them to the translation dictionary. When the search is repeated with the updated translation dictionary, the CLIR system 202 may be able to identify additional relevant documents.

C. Representative Processing Functionality

FIG. 7 sets forth illustrative electrical data processing functionality 700 that can be used to implement any aspect of the functions described above. With reference to FIG. 2, for instance, the type of processing functionality 700 shown in FIG. 7 can be used to implement any aspect of the CLIR system 202. The type of processing functionality 700 shown in FIG. 7 can also be used to implement any aspect of a client module (not shown) that is used to access the CLIR system 202. In one case, the processing functionality 700 may correspond to any type of computing device that includes one or more processing devices. In one case, the computing device is local with respect to the user. In another case, the computing device is remote with respect to the user (e.g., representing a server-type network resource or the like).

The processing functionality 700 can include volatile and non-volatile memory, such as RAM 702 and ROM 704, as well as one or more processing devices 706. The processing functionality 700 also optionally includes various media devices 708, such as a hard disk module, an optical disk module, and so forth. The processing functionality 700 can perform various operations identified above when the processing device(s) 706 executes instructions that are maintained by memory (e.g., RAM 702, ROM 704, or elsewhere).

More generally, instructions and other information can be stored on any computer-readable medium 710, including, but not limited to, static memory storage devices, magnetic storage devices, optical storage devices, and so on. The term computer-readable medium also encompasses plural storage devices. The term computer-readable medium also encompasses signals transmitted from a first location to a second location, e.g., via wire, cable, wireless transmission, etc.

The processing functionality 700 also includes an input/output module 712 for receiving various inputs from a user (via input modules 714), and for providing various outputs to the user (via output modules). One particular output mechanism may include a presentation module 716 and an associated graphical user interface (GUI) 718. The processing functionality 700 can also include one or more network interfaces 720 for exchanging data with other devices via one or more communication conduits 722. For example, the communication conduit(s) 722 can be used to couple the CLIR system 202 and one or more client modules. One or more communication buses 724 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented using electrical data processing functionality, for retrieving information, comprising:
   receiving a query in a source language, the query having one or more query terms;
   determining whether each of the query terms is present in a translation dictionary, the translation dictionary mapping terms from the source language to a target language, each query term that is present in the translation dictionary comprising an in-vocabulary term, and each query term that is not present in the translation dictionary comprising an out-of-vocabulary (OOV) term;
   translating each in-vocabulary term to a translated term in the target language using the translation dictionary, to provide a set of one or more translated terms;
   identifying at least one document that is selected from a collection of documents in the target language based on the set of translated terms, said at least one document including a plurality of candidate words in the target language;
   performing mining analysis to attempt to extract a viable transliteration of each OOV term of the query from said at least one document by:
   (a) selecting an OOV term in the query for analysis, to provide a selected OOV term;
   (b) determining, after said selecting of the OOV term, whether the OOV term is a qualifying OOV term;
   (c) selecting a candidate word in said at least one document, to provide a selected candidate word;
   (d) determining, after said selecting of the candidate word, whether the selected candidate word is a qualifying candidate word;
   (e) determining a transliteration measure between the selected candidate word and the selected OOV term, without first having generated a transliteration for the selected OOV term, said determining of the transliteration measure being performed when the selected candidate word is a qualifying candidate word and the selected OOV term is a qualifying OOV term;
   (f) determining whether the selected candidate word is a viable transliteration of the selected OOV term based on the transliteration measure; and
   performing operations (a) through (f) for each possible other pairing of an OOV term in the query and a candidate word in said at least one document;
   updating the translation dictionary to include each viable transliteration identified by the mining analysis, to provide an updated translation dictionary and an updated set of translated terms for the query; and
   repeating said identifying, performing the mining analysis, and updating, at least one time,
   said receiving, determining whether each of the query terms is present in a translation dictionary, translating, identifying, performing the mining analysis, updating, and repeating being performed by the electrical data processing functionality.

2. The method of claim 1, wherein the source language and the target language have different respective orthographies.

3. The method of claim 1, wherein the source language and the target language use different respective phonetic alphabets.

4. The method of claim 1, wherein the mining analysis is performed without consideration of whether each selected OOV term is a named entity and without consideration of whether each selected candidate word is a named entity.

5. The method of claim 1, further comprising supplementing the mining analysis by performing machine transliteration.

6. The method of claim 5, wherein the machine transliteration is applied to an OOV term under consideration after determination that the mining analysis has been unsuccessful in generating a viable transliteration for the OOV term under consideration.

7. The method of claim 1, wherein a qualifying OOV term is an OOV term that is determined to be transliteratable.

8. The method of claim 1, wherein a qualifying candidate word is a candidate word that is determined to be transliteratable.

9. The method of claim 1, wherein a qualifying candidate word is a candidate word that has a length that differs from a length of the selected OOV term by no more than a prescribed number of characters.

10. A tangible computer-readable storage medium for storing computer-readable instructions, the computer-readable instructions providing an information retrieval system when executed by one or more processing devices, the computer-readable instructions performing a method comprising:
   receiving a query in a source language, the query having one or more query terms;
   determining whether each of the query terms is present in a translation dictionary, the translation dictionary mapping terms from the source language to a target language, each query term that is present in the translation dictionary comprising an in-vocabulary term, and each query term that is not present in the translation dictionary comprising an out-of-vocabulary (OOV) term;
   translating each in-vocabulary term to a translated term in the target language using the translation dictionary, to provide a set of one or more translated terms;
   identifying at least one document that is selected from a collection of documents in the target language based on the set of translated terms, said at least one document including a plurality of candidate words in the target language;

performing mining analysis to attempt to extract a viable transliteration of each OOV term of the query from said at least one document by:
  (a) selecting an OOV term in the query for analysis, to provide a selected OOV term;
  (b) determining, after said selecting of the OOV term, whether the OOV term is transliteratable;
  (c) selecting a candidate word in said at least one document, to provide a selected candidate word;
  (d) determining, after said selecting of the candidate word, whether the selected candidate word is transliteratable, and whether the selected candidate word has a length that differs from a length of the selected OOV term by no more than a prescribed number of characters;
  (e) determining a transliteration measure between the selected candidate word and the selected OOV term, without first having generated a transliteration for the selected OOV term, said determining of the transliteration measure being performed when the selected OOV term and the selected candidate word are each transliteratable, and when the length of the selected OOV differs from the length of the selected OOV term by no more than a prescribed number of characters;
  (f) determining whether the selected candidate word is a viable transliteration of the selected OOV term based on the transliteration measure; and
  performing operations (a) through (f) for each possible other pairing of an OOV term in the query and a candidate word in said at least one document;
updating the translation dictionary to include each viable transliteration identified by the mining analysis, to provide an updated translation dictionary and an updated set of translated terms for the query; and
repeating said identifying, performing the mining analysis, and updating, at least one time.

11. The tangible computer-readable storage medium of claim 10, wherein the mining analysis is performed without consideration of whether each selected OOV term is a named entity and without consideration of whether each selected candidate word is a named entity.

12. An information retrieval system, implemented by electrical data processing functionality, for retrieving information, comprising:
  a data store that provides a translation dictionary for correlating terms in a source language to corresponding terms in a target language; and
  a transliteration processing module configured to convert queries in the source language to respective counterparts in the target language, the queries encompassing a query that includes an in-vocabulary component and an out-of-vocabulary (OOV) component, the in-vocabulary component comprising at least one in-vocabulary term that is included in the translation dictionary, and the OOV component comprising at least one OOV term that is not included in the translation dictionary, the transliteration processing module comprising:
    an in-vocabulary determination module configured to determine, using the translation dictionary, a translated term for each in-vocabulary term of the query, to provide a set of one or more translated terms;
    a mining module configured to attempt to identify, within a body of information, a viable transliteration of each OOV term in the query, the body of information being identified based on the set of translated terms provided by the in-vocabulary determination module,
    wherein the body of information includes a plurality of candidate words in the target language, and wherein the mining module is configured to analyze each pairing of a selected OOV term in the query and a selected candidate word in the body of information without first having generated a transliteration for the selected OOV term and without consideration of whether the OOV term is a named entity, by attempting to:
      determine a transliteration measure between the selected candidate word and the selected OOV term when the selected candidate word is a qualifying candidate word and the selected OOV term is a qualifying OOV term; and
      determine whether the selected candidate word is a viable transliteration of the selected OOV term based on the transliteration measure; and
    an updating module configured to add each viable transliteration identified by the mining module to the translation dictionary to provide an updated translation dictionary.

13. The information retrieval system of claim 12, further comprising a document retrieval module, the document retrieval module being configured to retrieve the body of information.

14. The information retrieval system of claim 13, wherein the body of information comprises at least one document, and wherein the document retrieval module is configured to select said at least one document from a collection of documents based on the set of translated terms.

15. The information retrieval system of claim 12, wherein the information retrieval system is further configured to identify another body of information associated with the in-vocabulary component of the query, using the updated translation dictionary.

16. The information retrieval system of claim 12, wherein the source language and the target language have different respective orthographies.

17. The information retrieval system of claim 12, wherein the source language and the target language use different respective phonetic alphabets.

18. The information retrieval system of claim 12, wherein the qualifying OOV term is an OOV term that is determined to be transliteratable.

19. The information retrieval system of claim 12, wherein the qualifying candidate word is a candidate word that is determined to be transliteratable, and has a length that differs from a length of the selected OOV term by no more than a prescribed number of characters.

20. The information retrieval system of claim 12, further including a machine transliteration module configured to perform machine transliteration, wherein the information retrieval system is configured to invoke the machine transliteration module for an OOV term under consideration upon determining that the mining module has been unsuccessful in generating a viable transliteration for the OOV term under consideration.

* * * * *